(12) United States Patent
Ogino et al.

(10) Patent No.: US 11,482,742 B2
(45) Date of Patent: Oct. 25, 2022

(54) BATTERY MODULE, BATTERY PACK, AND INTEGRATED BATTERY PACK

(71) Applicant: Panasonic Intellectual Property Management Co., Ltd., Osaka (JP)

(72) Inventors: Hirotaka Ogino, Osaka (JP); Chifumi Murayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 155 days.

(21) Appl. No.: 16/631,483

(22) PCT Filed: Jul. 24, 2018

(86) PCT No.: PCT/JP2018/027586
§ 371 (c)(1),
(2) Date: Jan. 16, 2020

(87) PCT Pub. No.: WO2019/026676
PCT Pub. Date: Feb. 7, 2019

(65) Prior Publication Data
US 2020/0212525 A1 Jul. 2, 2020

(30) Foreign Application Priority Data
Jul. 31, 2017 (JP) .............................. JP2017-148013

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ............. H01M 10/6568; H01M 50/20; H01M 10/613; H01M 10/625; H01M 10/647;
(Continued)

(56) References Cited

U.S. PATENT DOCUMENTS

| | | | | |
|---|---|---|---|---|
| 4,310,605 A | * | 1/1982 | Early ................ | H01M 8/04865 |
| | | | | 429/432 |
| 8,507,121 B2 | * | 8/2013 | Saito ................... | H01M 10/658 |
| | | | | 429/96 |

(Continued)

FOREIGN PATENT DOCUMENTS

| | | | |
|---|---|---|---|
| JP | 2012-248520 | * | 12/2012 |
| JP | 2013-012700 A | | 1/2013 |

(Continued)

OTHER PUBLICATIONS

International Search Report of PCT application No. PCT/JP2018/027586 dated Aug. 21, 2018.

*Primary Examiner* — Kaity V Chandler
(74) *Attorney, Agent, or Firm* — McDermott Will & Emery LLP

(57) ABSTRACT

A battery module includes: a battery stack; a restraint member on one side that restrains one side, in a Y direction, of the battery stack and includes a coolant passage on one side through which coolant flows; a restraint member on the other side that restrains the other side, in the Y direction, of the battery stack and includes a coolant passage on the other side through which coolant flows; an end plate on one side that restrains one side, in an X direction, of the battery stack; and an end plate on the other side that restrains the other side, in the X direction, of the battery stack. At least one of the end plates on the sides, includes a coolant passage on end side through which coolant passes, and the coolant passage on the end side communicates with the coolant passages on the sides.

4 Claims, 5 Drawing Sheets

(51) Int. Cl.
  *H01M 10/625* (2014.01)
  *H01M 10/647* (2014.01)
  *H01M 10/6556* (2014.01)
  *H01M 10/6563* (2014.01)
  *H01M 10/6554* (2014.01)
  *H01M 50/20* (2021.01)

(52) U.S. Cl.
  CPC ..... *H01M 10/647* (2015.04); *H01M 10/6554* (2015.04); *H01M 10/6556* (2015.04); *H01M 10/6563* (2015.04); *H01M 50/20* (2021.01)

(58) Field of Classification Search
  CPC ......... H01M 10/6554; H01M 10/6556; H01M 10/6563; Y02E 60/10
  See application file for complete search history.

(56) References Cited

U.S. PATENT DOCUMENTS

| | | | | |
|---|---|---|---|---|
| 8,816,716 | B2* | 8/2014 | Tokitsu | H01M 50/572 324/365 |
| 8,999,547 | B2* | 4/2015 | Cha | H01M 10/6556 429/120 |
| 9,054,401 | B2* | 6/2015 | Hopkins | H01M 10/637 |
| 9,406,916 | B2* | 8/2016 | Kim | H01M 50/502 |
| 9,419,264 | B2* | 8/2016 | Idikurt | H01M 50/264 |
| 9,876,204 | B2* | 1/2018 | Kim | H01M 50/105 |
| 10,003,112 | B1* | 6/2018 | Boor | H01M 50/502 |
| 10,044,078 | B2* | 8/2018 | Jung | H01M 50/20 |
| 10,153,526 | B2* | 12/2018 | Motohashi | H01M 10/625 |
| 10,777,860 | B2* | 9/2020 | Jo | H01M 10/6556 |
| 2003/0091884 | A1* | 5/2003 | Scartozzi | H01M 8/241 429/437 |
| 2007/0026301 | A1* | 2/2007 | Lee | H01M 10/6557 429/50 |
| 2009/0142653 | A1* | 6/2009 | Okada | H01M 10/647 429/120 |
| 2011/0003187 | A1* | 1/2011 | Graaf | H01M 10/6555 429/120 |
| 2011/0020677 | A1* | 1/2011 | Shin | H01M 10/6563 429/71 |
| 2011/0104547 | A1* | 5/2011 | Saito | H01M 10/6557 429/120 |
| 2011/0206948 | A1* | 8/2011 | Asai | H01M 10/6554 429/7 |
| 2012/0028099 | A1* | 2/2012 | Aoki | H01M 10/643 429/120 |
| 2012/0100450 | A1* | 4/2012 | Lee | H01M 8/241 429/436 |
| 2013/0017470 | A1* | 1/2013 | Hotta | H01M 8/026 429/458 |
| 2014/0141298 | A1* | 5/2014 | Michelitsch | H01M 50/249 429/71 |
| 2014/0220391 | A1 | 8/2014 | Fujii et al. | |
| 2014/0342195 | A1 | 11/2014 | Bhola et al. | |
| 2014/0349210 | A1* | 11/2014 | Kobayashi | H01M 8/241 429/470 |
| 2015/0129332 | A1 | 5/2015 | Seto et al. | |
| 2017/0194680 | A1 | 7/2017 | Muck et al. | |
| 2018/0175466 | A1* | 6/2018 | Seo | H01M 50/20 |
| 2018/0219191 | A1* | 8/2018 | Drews | H01M 10/613 |
| 2018/0316072 | A1* | 11/2018 | Xiao | H01M 50/20 |
| 2019/0115637 | A1* | 4/2019 | Kim | H01M 50/289 |
| 2019/0143836 | A1* | 5/2019 | Burrows | H01M 10/6556 429/120 |

FOREIGN PATENT DOCUMENTS

| | | |
|---|---|---|
| JP | 2015-069845 A | 4/2015 |
| WO | 2013/031613 | 3/2013 |
| WO | 2014/024425 | 2/2014 |
| WO | 2016/037714 | 3/2016 |

\* cited by examiner

BATTERY MODULE, BATTERY PACK, AND INTEGRATED BATTERY PACK

CROSS-REFERENCE TO RELATED APPLICATIONS

This application is a U.S. national stage application of the PCT International Application No. PCT/JP2018/027586 filed on Jul. 24, 2018, which claims the benefit of foreign priority of Japanese patent application 2017-148013 filed on Jul. 31, 2017, the contents all of which are incorporated herein by reference.

TECHNICAL FIELD

The present disclosure relates to a battery module, a battery pack that includes the battery module, and an integrated battery pack that includes a plurality of battery packs joined together.

BACKGROUND ART

As disclosed in PTL 1, some conventional battery modules include a plurality of rectangular (=prismatic) batteries that each have a substantially rectangular-parallelepiped shape, an end plate on one side, an end plate on the other side, a binding bar on one side, and a binding bar on the other side.

The plurality of rectangular batteries are stacked in a row in a thickness direction, and thus constitute a battery stack. The plurality of rectangular batteries that have been stacked are in a same posture. The end plate on one side is on one side, in a stacking direction, of the battery stack, extends in a perpendicular direction that is perpendicular to the stacking direction, and restrains the one side, in the stacking direction, of the battery stack. The end plate on the other side is on the other side, in the stacking direction, of the battery stack, extends in the perpendicular direction, and restrains the other side, in the stacking direction, of the battery stack. The binding-bar-on-one-side is on one side, in the perpendicular direction, of the battery stack, extends in the stacking direction, and restrains the one side, in the perpendicular direction, of the battery stack. The binding-bar-on-the-other-side is on the other side, in the perpendicular direction, of the battery stack, extends in the stacking direction, and restrains the other side, in the perpendicular direction, of the battery stack.

The binding bars are connected with the end plates on both the sides. The two binding bars and the two end plates are integrated together, and surround the battery stack. Rectangular batteries expand due to charging and discharging, or degradation of the batteries. In the battery module, the two binding bars and the two end plates apply predetermined compressing pressure in the stacking direction to the battery stack. Consequently, deformation or expansion of the battery stack due to expansion of the rectangular batteries does not occur.

CITATION LIST

Patent Literature

PTL 1: WO 2014/024425 A

SUMMARY OF THE INVENTION

If a conventional cooler is provided for the above battery module, the conventional cooler is provided outside the binding bars. Therefore, a size of the battery module tends to increase. Further, since the rectangular batteries are cooled through the binding bars, it is difficult to cool the rectangular batteries.

It is an object of the present disclosure to provide a battery module, a battery pack, and an integrated battery pack that each reduce deformation or expansion, and improve cooling performance, and are easily miniaturized or downsized.

A battery module according to an aspect of the present disclosure includes: a battery stack that includes a plurality of rectangular batteries that each have a substantially rectangular-parallelepiped shape, and are stacked in a row in a thickness direction; a restraint member on one side in a perpendicular direction that is perpendicular to a stacking direction of the battery stack, the restraint member on the one side in the perpendicular direction: including a coolant passage on one side through which coolant flows; and restraining at the one side in the perpendicular direction, such that side surfaces of the rectangular batteries on the one side in the perpendicular direction, are on a substantially same plane; a restraint member on the another side in the perpendicular direction of the battery stack, that includes a coolant passage on the another side through which coolant flows and restrains at the another side in the perpendicular direction, such that side surfaces of the rectangular batteries on the another side in the perpendicular direction, are on a substantially same plane; an end plate on one side in the stacking direction of the battery stack, that is in contact with an end surface on the one side in the stacking direction of the battery stack, the end plate on the one side in the stacking direction restraining at the one side in the stacking direction; and an end plate on the another side in the stacking direction of the battery stack, that is in contact with an end surface on the another side in the stacking direction of the battery stack, and the end plate on the another side in the stacking direction restraining at the another side in the stacking direction.

Further, at least one of the end plate on the one side in the stacking direction and the end plate on the another side in the stacking direction, includes a coolant passage on end side through which coolant passes, and the coolant passage on the end side communicates with the coolant passage on one side and the coolant passage on the another side.

A battery pack according to another aspect of the present disclosure includes: a plurality of battery stacks that are arranged in a plurality of rows, and each include a plurality of rectangular batteries that each have a substantially rectangular-parallelepiped shape, and are stacked in a row in a thickness direction; a shared restraint member that is between each of one and another battery stacks of two adjacent battery stacks of the battery stacks that are adjacent to each other in a perpendicular direction that is perpendicular to a stacking direction, the shared restraint member restraining: a side surface on a side of the another battery stack, in the one battery stack; and a side surface on a side of the one battery stack, in the another battery stack, the shared restraint member including a shared coolant passage through which coolant flows, the coolant cooling both the one battery stack and the another battery stack simultaneously; external restraint members that restrain external sides in the perpendicular direction of the battery stacks, the external sides being located at both ends in the perpendicular direction in the plurality of battery stacks, the external restraint members each including an external coolant passage through which coolant flows; an end plate on one side in the stacking direction that is integral and restrains the one side in the stacking direction of the plurality of battery stacks; and an end plate on another side in the stacking direction that is integral and restrains the another side in the stacking direction of the plurality of battery stacks.

Further, at least one of the end plate on the one side in the stacking direction and the end plate on the another side in the stacking direction, includes a coolant passage on end side through which coolant passes, and the coolant passage on the end side communicates with the shared coolant passage and the external coolant passage of each of the external restraint members.

A battery module, a battery pack, and an integrated battery pack according to an aspect of the present disclosure reduce deformation or expansion, improve cooling performance, and are easily miniaturized or downsized.

DESCRIPTION OF EMBODIMENT

Hereinafter, an exemplary embodiment of the present disclosure will be described in detail with reference to the attached drawings. It is envisaged from a beginning that if a plurality of exemplary embodiments and variations are described below, distinctive elements of the plurality of exemplary embodiments and variations are appropriately combined to make new exemplary embodiments. In a description of the exemplary embodiment described later and the drawings, an X direction represents a stacking direction in which rectangular (=prismatic) batteries are stacked, and corresponds to a thickness direction of the rectangular batteries. A Y direction represents a perpendicular direction that is perpendicular to the stacking direction. A Z direction represents a height direction of the rectangular batteries, corresponds to a height direction of a battery module, and also corresponds to a height direction of a battery pack. The X direction, Y direction, and Z direction are perpendicular to each other.

Figure 1:
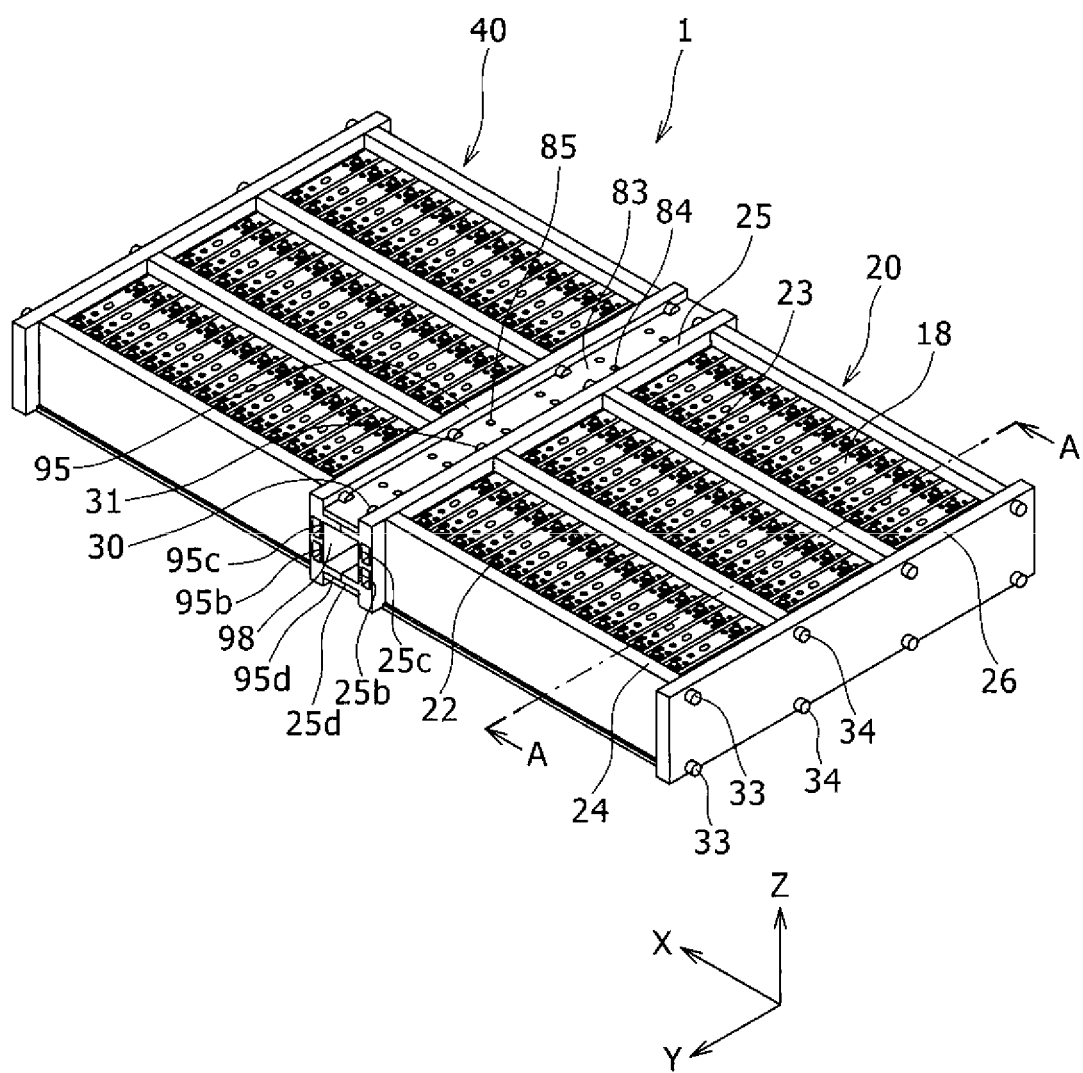
FIG. 1 is a perspective view of an internal configuration of an integrated battery pack according to an exemplary embodiment of the present disclosure.

FIG. 1 is a perspective view of integrated battery pack 1 according to the exemplary embodiment of the present disclosure. As illustrated in FIG. 1, integrated battery pack 1 includes two first and second battery packs 20, 40. An end, on one side in the X direction, of first battery pack 20 is joined to an end, on the other side in the X direction, of second battery pack 40 to make integrated battery pack 1. As described later, an only difference between first battery pack 20 and second battery pack 40 is a difference in sides, in the Y direction, of openings of coolant passages on end side of end plates. A description of battery pack 40 will be omitted by a description of first battery pack 20 that is similar to battery pack 40.

The integrated battery pack may include a case. A configuration illustrated in FIG. 1 is a main body of the integrated battery pack housed in the case. The case includes a bottom plate and a cover, for example. The bottom plate has a substantially rectangular shape in a plan view. Only one side, in the Z direction, of the cover is open, and the cover defines a space that has a substantially rectangular-parallelepiped shape. The main body of the integrated battery pack is placed on an upper surface of the bottom plate. The main body of the integrated battery pack is covered with the cover. Consequently, the main body of the integrated battery pack is housed within the space. The cover in that state is fixed to the bottom plate with a fixing means, such as fastening members or adhesive. In that way, the main body of the integrated battery pack is disposed within the case. The main body of the integrated battery pack may not be fixed to the bottom plate. Preferably, however, the main body of the integrated battery pack is fastened to the bottom plate at four corners of the main body of the integrated battery pack since rigidity of the integrated battery pack increases, and the main body of the integrated battery pack is accurately positioned.

First battery pack 20 includes a plurality of battery stacks 22, a plurality of shared restraint members 23, two external restraint members 24, end plate 25 on one side, and end plate 26 on the other side. The plurality of battery stacks 22 are arranged in a plurality of rows. Each of battery stacks 22 includes a plurality of rectangular batteries 18. The plurality of rectangular batteries 18 each have a substantially rectangular-parallelepiped shape, and are tightly stacked in a row in the X direction. The plurality of rectangular batteries 18 that have been stacked are in a same posture. For example, rectangular batteries 18 are rechargeable secondary batteries, such as lithium-ion batteries, nickel metal hydride batteries, or nickel-cadmium batteries. A main surface of each of rectangular batteries 18 is covered with an insulating sheet, such as a heat shrink tube. In FIG. 1, first battery pack 20 includes battery stacks 22 arranged in three rows. However, a battery pack may include battery stacks arranged in two rows, or may include battery stacks arranged in at least four rows. Each of battery stacks 22 may include a plurality of separators (not illustrated). The plurality of separators are made of resin. The plurality of separators and the plurality of rectangular batteries 18 are alternately stacked. The separators may insulate rectangular batteries 18 from adjacent rectangular batteries 18.

Each of shared restraint members 23 is between two each of adjacent battery stacks 22 that are adjacent to each other in the Y direction. Each of shared restraint members 23 is a plate member that has a shape like a long flat plate. Each of shared restraint members 23 extends in the X direction. A longitudinal direction of each of shared restraint members 23 corresponds to the X direction. A width direction of each of shared restraint members 23 corresponds to the Z direction. With respect to two battery stacks 22 that are adjacent to each other in the Y direction, one shared restraint member 23 restrains a side surface, adjacent to other battery stack 22, of one battery stack 22, and restrains a side surface, adjacent to one battery stack 22, of other battery stack 22.

External restraint members 24 restrain external sides, in the Y direction, of battery stacks 22, respectively, that are located at both ends, in the Y direction, of the plurality of rows of battery stacks 22. Each of external restraint members 24 is a plate member that has a shape like a long flat plate. Each of external restraint members 24 extends in the X direction. A longitudinal direction of each of external restraint members 24 corresponds to the X direction. A width direction of each of external restraint members 24 corresponds to the Z direction.

End plate 25 on one side restrains one side, in the X direction, of the plurality of rows of battery stacks 22. End plate 25 on one side is a plate member that has a substantially rectangular shape in a plan view and has a shape like a flat plate, and extends in the Y direction. A longitudinal direction of end plate 25 on one side corresponds to the Y direction. A width direction of end plate 25 on one side corresponds to the Z direction. End plate 25 on one side is fixed to an end surface, on one side in the X direction, of each of external restraint members 24 with a plurality of bolts 30. The plurality of bolts 30 are arranged in the Z direction, and are apart from each other. Further, end plate 25 on one side is fixed to an end surface, on one side in the X direction, of each of shared restraint members 23 with a plurality of bolts 31. The plurality of bolts 31 are arranged in the Z direction, and are apart from each other.

End plate 26 on the other side restrains the other side, in the X direction, of the plurality of rows of battery stacks 22. End plate 26 on the other side is a plate member that has a substantially rectangular shape in a plan view and has a shape like a flat plate, and extends in the Y direction. A longitudinal direction of end plate 26 on the other side corresponds to the Y direction. A width direction of end plate 26 on the other side corresponds to the Z direction. End plate 26 on the other side is fixed to an end surface, on the other side in the X direction, of each of external restraint members 24 with a plurality of bolts 33. The plurality of bolts 33 are arranged in the Z direction, and are apart from each other. Further, end plate 26 on the other side is fixed to an end surface, on the other side in the X direction, of each of shared restraint members 23 with a plurality of bolts 34. The plurality of bolts 34 are arranged in the Z direction, and are apart from each other.

All shared restraint members 23 and two external restraint members 24 are fixed to end plate 25 on one side and end plate 26 on the other side. Consequently, the plurality of battery stacks 22 arranged in the plurality of rows, all shared restraint members 23, two external restraint members 24, end plate 25 on one side, and end plate 26 on the other side are joined together and integrated. Shared restraint member 23, external restraint member 24, end plate 25 on one side, and end plate 26 on the other side tightly surround battery stack 22 that is at an end in the Y direction. Predetermined compressing pressure in the X direction is applied to battery stack 22. Consequently, the compressing pressure reduces deformation or expansion of battery stack 22. Two shared restraint members 23, end plate 25 on one side, and end plate 26 on the other side tightly surround battery stack 22 that is not located at an end in the Y direction. Predetermined compressing pressure in the X direction is applied to battery stack 22. Consequently, also in that case, the compressing pressure reduces deformation or expansion of battery stack 22.

Each battery stack 22 may include a spacer (not illustrated) that is between rectangular battery 18 that is at one end in the X direction and end plate 25 on one side, and fills a gap between rectangular battery 18 that is at the one end and end plate 25 on one side. Further, each battery stack 22 may include a spacer (not illustrated) that is between rectangular battery 18 that is at the other end in the X direction and end plate 26 on the other side, and fills a gap between rectangular battery 18 that is at the other end and end plate 26 on the other side. Consequently, battery stack 22 is surely fixed in a stacking direction. Further, end plate 25 on the one side and end plate 26 on the other side are tightly fixed to end surfaces of all shared restraint members 23, and end surfaces of two external restraint members 24. Preferably, the spacers are elastic. In that case, even if variation in dimensions of a gap between rectangular battery 18 at an end in the X direction and at least one of end plate 25 on the one side and end plate 26 on the other side occurs, the spacers easily fill the gap between rectangular battery 18 at an end in the X direction and at least one of end plate 25 on the one side and end plate 26 on the other side, and thus battery stacks 22 are surely fixed, and end plate 25 on the one side and end plate 26 on the other side are tightly fixed to end surfaces of all shared restraint members 23, and end surfaces of two external restraint members 24.

Figure 2:
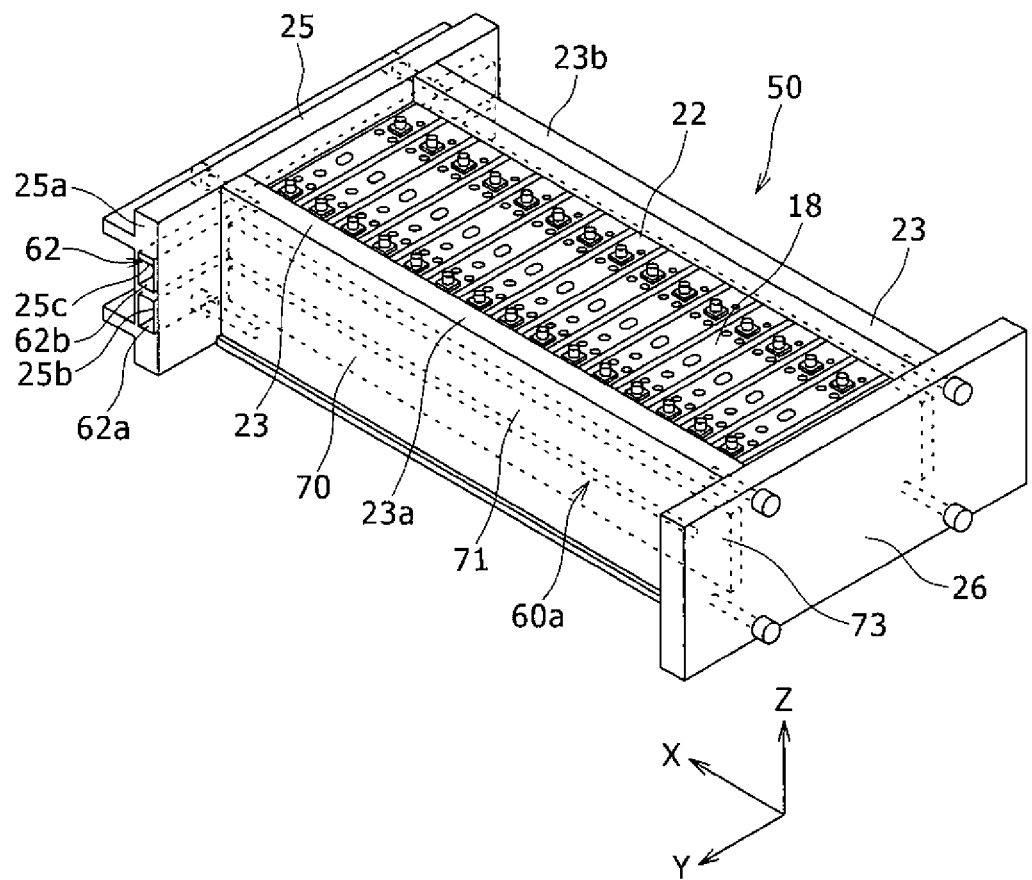
FIG. 2 is an enlarged perspective view of outside of a battery stack that is not at an end, in a perpendicular direction, in FIG. 1, and is a perspective view of a battery module.

FIG. 2 is an enlarged perspective view of outside of battery stack 22 that is not at an end, in the Y direction, in FIG. 1, and is a perspective view of battery module 50. As illustrated in FIG. 2, battery module 50 includes restraint member 23a on one side, restraint member 23b on the other side, end plate 25 on one side, and end plate 26 on the other side.

Restraint member 23a on one side restrains one side, in the Y direction, of battery stack 22, and thus side surfaces, on one side in the Y direction, of rectangular batteries 18 are on a substantially same plane. Restraint member 23a on one side contains coolant passage on one side 60a through which coolant flows. Restraint member 23b on the other side restrains the other side, in the Y direction, of battery stack 22, and thus side surfaces, on the other side in the Y direction, of rectangular batteries 18 are on a substantially same plane. Restraint member 23b on the other side contains a coolant passage on the other side (not illustrated) through which coolant flows.

End plate 25 on one side is in contact with an end surface, on one side in the X direction, of battery stack 22, and thus restrains the one side, in the X direction, of battery stack 22. End plate 26 on the other side is in contact with an end surface, on the other side in the X direction, of battery stack 22, and thus restrains the other side, in the X direction, of battery stack 22. End plate 25 on one side contains coolant passage on end side 62 through which coolant passes. Coolant passage on end side 62 communicates with coolant passage on one side 60a and the above coolant passage on the other side (not illustrated).

Coolant passage on end side 62 includes coolant supplying passage 62a and coolant discharging passage 62b. As illustrated in FIG. 2, coolant supplying passage 62a includes coolant supplying opening 25b at end surface 25a on one side in the Y direction of end plate 25 on one side. Further, coolant discharging passage 62b includes coolant discharging opening 25c at end surface 25a on one side described above. As illustrated in FIG. 2, coolant supplying passage 62a extends from coolant supplying opening 25b to the other side in the Y direction. Further, coolant discharging passage 62b extends from coolant discharging opening 25c to the other side in the Y direction. Coolant discharging passage 62b is apart from coolant supplying passage 62a. Coolant discharging passage 62b extends substantially parallel to coolant supplying passage 62a. In an example illustrated in FIG. 2, coolant discharging passage 62b is disposed over, in the Z direction, coolant supplying passage 62a.

Each of coolant passage on one side 60a and the coolant passage on the other side (not illustrated) is U-shaped and contains coolant inflow passage 70 that extends in the X direction, coolant outflow passage 71 that extends in parallel to coolant inflow passage 70, and connecting passage 73. Each of coolant inflow passage 70 and coolant outflow passage 71 extends from one end, in the X direction, to the other end, in the X direction, of restraint member 23a on one side or restraint member 23b on the other side. Each of coolant inflow passage 70 and coolant outflow passage 71 extends a substantially whole area, in the Y direction, of restraint member 23a on one side or restraint member 23b on the other side. Connecting passage 73 extends in the Z direction. Connecting passage 73 connects and communicates the other end, in the X direction, of coolant inflow passage 70 with the other end, in the X direction, of coolant outflow passage 71. More specifically, coolant passage on one side 60a, the coolant passage on the other side, coolant inflow passage 70, coolant outflow passage 71, and connecting passage 73 are communicated with each other by fixing end plate 25 on one side and end plate 26 on the other side to all shared restraint members 23 and two external restraint members 24.

In the battery module illustrated in FIG. 2, restraint member 23a on one side and restraint member 23b on the other side correspond to shared restraint members 23, and coolant passage on one side 60a and the coolant passage on the other side correspond to shared coolant passages 60. Each of shared restraint members 23 is disposed between each two battery stacks 22 that are adjacent to each other in the Y direction. Therefore, coolant that flows through shared coolant passage 60 of shared restraint member 23 simultaneously cools both two battery stacks 22 that are located on both sides, in the Y direction, of shared coolant passage 60. For example, the coolant is water, insulating oil, antifreeze solution, refrigerant that evaporates within the coolant passages and cools the passages with latent heat of vaporization, or air. If the battery packs are attached to a vehicle, cooling water that cools a motor generator and an inverter may be used as the coolant.

All battery modules 50 stacked in the Y direction share same end plate 25 on one side and same end plate 26 on the other side. One of the restraint member on one side and the restraint member on the other side of battery module 50 at an end in the Y direction corresponds to external restraint member 24. One of coolant passage on one side 60a and the coolant passage on the other side of battery module 50 at an end in the Y direction corresponds to external coolant passage 65 (see FIG. 3). Since external restraint member 24 is disposed at an end on an external side in the Y direction, coolant that flows through external coolant passage 65 of external restraint member 24 cools only one battery stack 22 that is located on an internal side, in the Y direction, of external coolant passage 65.

In each of battery modules 50 stacked in the Y direction, one end of coolant passage on one side 60a that is U-shaped of each of battery modules 50 and one end of the coolant passage on the other side that is U-shaped of each of battery modules 50 each communicate with coolant supplying passage 62a of coolant passage on end side 62. Further, in each of battery modules 50 stacked in the Y direction, the other end of coolant passage on one side 60a and the other end of the coolant passage on the other side each communicate with coolant discharging passage 62b of coolant passage on end side 62.

Figure 3:
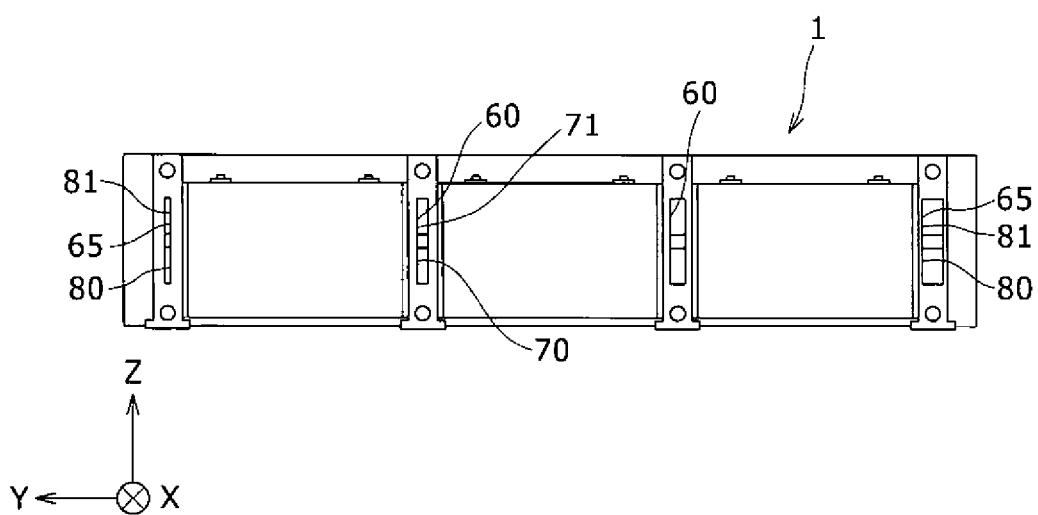
FIG. 3 is a cross-sectional view taken along line A-A of FIG. 1.

FIG. 3 is a cross-sectional view taken along line A-A of FIG. 1. With reference to FIG. 3, a passage on either side, in the Y direction, and on a lower side, in the Z direction, is coolant inflow passage 80 of external coolant passage 65. A passage on either side, in the Y direction, and on an upper side, in the Z direction, is coolant outflow passage 81 of external coolant passage 65. Further, passages that are not disposed at either end, in the Y direction, and are disposed on a lower side, in the Z direction, are coolant inflow passages 70 of shared coolant passages 60. Passages that are not disposed at either end, in the Y direction, and are disposed on an upper side, in the Z direction, are coolant outflow passages 71 of shared coolant passages 60. Coolant inflow passages 70 of shared coolant passages 60 and coolant inflow passages 80 of external coolant passages 65 communicate with coolant supplying passage 62a of coolant passage on end side 62. Further, coolant outflow passages 71 of shared coolant passages 60 and coolant outflow passages 81 of external coolant passages 65 communicate with coolant discharging passage 62b of coolant passage on end side 62. Each of battery stacks 22 is disposed in such a manner that battery stack 22 is thermally connected with some of restraint member 23a on one side, restraint member 23b on the other side, and shared restraint members 23. Each of battery stacks 22 may be directly in contact with restraint member 23a on one side, restraint member 23b on the other side, or shared restraint members 23. Alternatively, each of battery stacks 22 may be thermally connected, through any heat transfer member, with restraint member 23a on one side, restraint member 23b on the other side, or shared restraint members 23.

Figure 4:
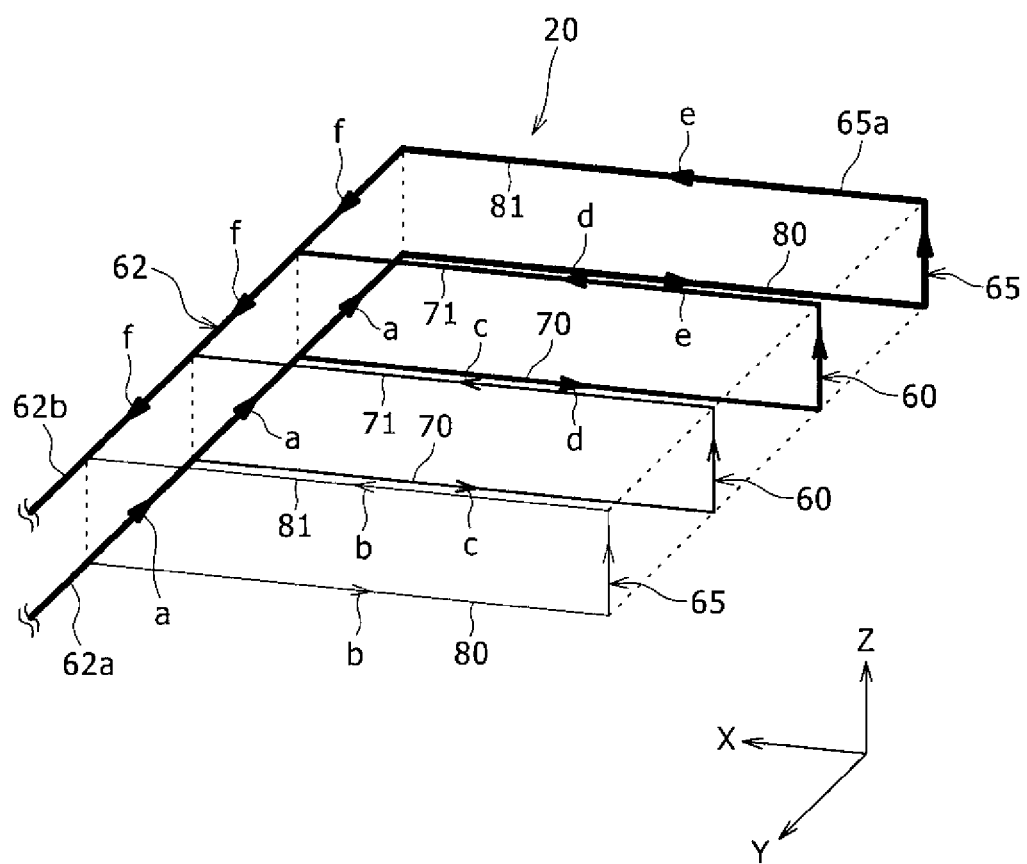
FIG. 4 is a schematic view that illustrates a flow of coolant within a first battery pack.

FIG. 4 is a schematic view that illustrates a flow of coolant within first battery pack 20. In FIG. 4, thicknesses of lines represent cross-sectional areas of the coolant passages. The thicker the lines, the larger the cross-sectional areas of the coolant passages. Therefore, in first battery pack 20, cross-sections of coolant supplying passage 62a and coolant discharging passage 62b of coolant passage on end side 62 are the largest. A shape and a size of coolant supplying passage 62a coincide with a shape and a size of coolant discharging passage 62b. The farther, in the Y direction, all shared coolant passages 60 and two external coolant passages 65 are from one side, in the Y direction (a near side in the paper of FIG. 4), of end plate 25 on one side (see FIG. 1), the more cross-sectional areas of all shared coolant passages 60 and two external coolant passages 65 gradually increase. In other words, the nearer to the other side, in the Y direction, all shared coolant passages 60 and two external coolant passages 65 go away from coolant supplying opening 25b at end surface 25a on one side in the Y direction 25a of end plate 25 on one side, the more cross-sectional areas of all shared coolant passages 60 and two external coolant passages 65 gradually increase. A cross-sectional area of external coolant passage 65a that is the farthest, in the Y direction, from coolant supplying opening 25b is equal to a cross-sectional area of coolant passage on end side 62. A shape and a size of external coolant passage 65a correspond to a shape and a size of coolant passage on end side 62.

With reference to FIG. 1 again, second battery pack 40 includes coolant supplying opening 95b and coolant discharging opening 95c that are on an opposite side, in the Y direction, of end plate 95 on one side. Second battery pack 40 differs from first battery pack 20 only in this respect. As illustrated in FIG. 1, first battery pack 20 and second battery pack 40 are arranged in such a manner that end plate 25 on one side of first battery pack 20 is opposite end plate 95 on one side of second battery pack 40. end plates 25, 95 on one side each include two projections 25d, 95d. Two projections 25d, 95d each have a plate-like shape, project externally in the Y direction, and extend in the Y direction. Two projections 25d, 95d of the plate-like shapes are arranged in the Z direction and are apart from each other.

One of projections 25d of end plate 25 on one side is at a height same as a height of one of projections 95d of end plate 95 on one side. The other of projections 25d of end plate 25 on one side is at a height same as a height of the other of projections 95d of end plate 95 on one side. An end surface of one of projections 25d of end plate 25 on one side is made into contact with an end surface of one of projections 95d of end plate 95 on one side. An end surface of the other of projections 25d of end plate 25 on one side is made into contact with an end surface of the other of projections 95d of end plate 95 on one side. Plate-like members 83 are disposed outside, in the Z direction, two projections 25d, 95d, respectively, that have been made into contact with each other. Plate-like members 83 are disposed across two projections 25d, 95d, respectively. Plate-like members 83 are fixed to projections 25d with bolts 84, and are fixed to projections 95d with bolts 85. Consequently, end plate 25 on one side of first battery pack 20 is joined to end plate 95 on one side of second battery pack 40. Consequently, first battery pack 20 and second battery pack 40 are integrated. The integration forms chamber 98 at a joint portion where first battery pack 20 is joined to second battery pack 40, more specifically, between two pairs of two projections 25d, 95d in the Z direction that have been made into contact with each other. Chamber 98 has a substantially rectangular cross-section.

In an example illustrated in FIG. 1, each of rectangular batteries 18 includes both a positive electrode and a negative electrode at an end, in the Z direction, on an upper surface of rectangular battery 18. For example, the plurality of rectangular batteries 18 in battery stack 22 are electrically connected with each other in series with bus bars (not illustrated). The plurality of battery stacks 22 in integrated battery pack 1 are electrically connected with each other in parallel with bus bars (not illustrated). Chamber 98 described above houses high-voltage cables used to supply electric power to, for example, a motor generator from integrated battery pack 1. The housed high-voltage cables are protected, and surely do not break. The plurality of rectangular batteries in the battery stack may be electrically connected with each other in parallel. The plurality of battery stacks in the integrated battery pack may be electrically connected with each other in series. The first battery pack and the second battery pack may be electrically connected with each other in series, or may be electrically connected with each other in parallel.

Coolant supplying passage 62a and coolant discharging passage 62b of coolant passage on end side 62 are connected to a coolant circulator through coolant passages. More specifically, if coolant is liquid, a discharge outlet of a pump is connected to coolant supplying passage 62a of coolant passage on end side 62 through a coolant passage, and a suction inlet of the pump is connected to coolant discharging passage 62b of coolant passage on end side 62 through a coolant passage, for example. Further, if coolant is refrigerant, a discharge outlet of a compressor is connected to coolant supplying passage 62a of coolant passage on end side 62 through a coolant passage, and a suction inlet of the compressor is connected to coolant discharging passage 62b of coolant passage on end side 62 through a coolant passage, for example. Further, if coolant is gas, a discharge outlet of a fan (blower) is connected to coolant supplying passage 62a of coolant passage on end side 62 through a coolant passage, and a suction inlet of the fan (blower) is connected to coolant discharging passage 62b of coolant passage on end side 62 through a coolant passage, for example. If the integrated battery pack includes a case, the case includes two through holes. However, the case will not be described in detail. One of the through holes is used to connect a discharge outlet of a coolant circulator that is outside the integrated battery pack with coolant supplying passage 62a. The other through hole is used to connect a suction inlet of the coolant circulator with coolant discharging passage 62b.

In the above configuration, battery stacks 22 within first battery pack 20 are cooled as described below. More specifically, the coolant discharged from the coolant circulator flows through coolant supplying passage 62a of end plate 25 on one side in a direction represented by arrow a in FIG. 4 from one side to the other side in the Y direction. At that time, when the coolant reaches positions where coolant supplying passage 62a is connected with coolant inflow passages 70, 80, part of the coolant flows into coolant inflow passages 70, 80. Consequently, a U-shaped flow of the coolant represented by arrow b, a U-shaped flow of the coolant represented by arrow b, a U-shaped flow of the coolant represented by arrow c, a U-shaped flow of the coolant represented by arrow d, a U-shaped flow of the coolant represented by arrow e are generated from a near side to a far side in the paper of FIG. 4. The flow rate of the coolant that flows through coolant supplying passage 62a, becomes smaller, as the flow goes nearer to the other side in the Y direction.

The coolant that flows through coolant inflow passages 70, 80 flows through coolant outflow passages 71, 81 and joins coolant discharging passage 62b. Then the coolant flows through coolant discharging passage 62b in a direction represented by arrow f to the other side in the Y direction. The flow rate of the coolant that flows through coolant discharging passage 62b, becomes larger, as the flow goes nearer to one side in the Y direction.

As illustrated in FIG. 3, U-shaped coolant passages 60, 65 are disposed on both sides, in the Y direction, of each of battery stacks 22 (see FIG. 1). Consequently, coolant that flows through coolant passages 60, 65 cools side surfaces, on both sides in the Y direction, of each of battery stacks 22. Further, coolant that flows through coolant supplying passage 62a and coolant discharging passage 62b cools an end surface, on one side in the X direction, of each of battery stacks 22.

According to the above exemplary embodiment, each of battery stacks 22 is surrounded by an integral structure that includes end plate 25 on one side and end plate 26 on the other side, and restraint member 23a on one side and restraint member 23b on the other side. Further, each of battery stacks 22 is sandwiched and held in the X direction by end plate 25 on one side and end plate 26 on the other side. Therefore, predetermined compressing pressure in the X direction is applied to battery stacks 22. Consequently, the compressing pressure reduces deformation or expansion of battery stacks 22.

Further, coolant passages 60, 65 are directly formed in restraint members 23, 24 that restrain lateral sides, in the Y direction, of battery stacks 22. In a case, a conventional cooler is disposed outside binding bars that restrain lateral sides in the Y direction of a battery stack, and the conventional cooler cools the stack. Compared with this case, battery stacks 22 are directly cooled not through binding bars, and cooling performance of battery stacks 22 is improved.

One shared restraint member 23 is disposed between two battery stacks 22 that are adjacent to each other in the Y direction. One shared restraint member 23 contains shared coolant passage 60. Shared restraint member 23 restrains at least a lateral portion, on one side in the Y direction, of each of two battery stacks 22. Therefore, a dimension, in the Y direction, of integrated battery pack 1 is reduced, compared with a case in which each of battery stacks is restrained by two special binding bars, and the two special binding bars restrain lateral portions, on both sides, of each of the battery stacks. Consequently, integrated battery pack 1 is compact.

Further, the cross-sectional areas of coolant passages 60, 65 of restraint members 23, 24 become larger, as coolant passages 60, 65 of restraint members 23, 24 go away from a discharge side of the coolant circulator in the Y direction. Therefore, as the fluid pressure of the flowing coolant becomes smaller, the cross-sectional areas of coolant passages 60, 65 become larger. Therefore, flow rates of the coolant that flows through coolant passages 60, 65 are nearly equal, irrespective of distances from the coolant circulator. Consequently, cooling performance of battery stacks 22 is nearly equal, irrespective of a distance from the coolant circulator. Therefore, layout of battery stacks 22 does not vary cooling performance.

The present disclosure should not be limited to the exemplary embodiment described above and variations of the exemplary embodiment described above, but the present disclosure is variously modified or varied within the scope of matters recited in the appended claims or equivalents of the appended claims.

For example, in the above exemplary embodiment, end plates 25, 95 on one side that are disposed on internal sides, in the X direction, of battery packs 20, 40 of integrated battery pack 1 contain the respective coolant passages. End plates 26 on the other side on external sides in the X direction do not contain respective coolant passages. However, end plates on the other side that are disposed on external sides, in the X direction, of battery packs 20, 40 of the integrated battery pack may contain respective coolant passages. Further, end plates on one side on internal sides, in the X direction, of the battery packs may not contain respective coolant passages. When only end plates on a unilateral(=one) side contain respective coolant passages in an integrated battery pack, it is preferable that end plates on an internal side in the X direction contain the respective coolant passages, since a flow of coolant of a battery pack on one side and a flow of a battery pack on the other side are easily integrated.

Further, in the above exemplary embodiment, only end plates 25, 95 on one side each disposed on a unilateral side, contain the respective coolant passages. However, both end plates on both sides, in the X direction, of the battery packs may contain coolant passages. In the above exemplary embodiment, restraint members 23, 24 contain respective U-shaped coolant passages 60, 65. However, an end plate on one side may contain a coolant supplying passage and a coolant discharging passage, as in the above exemplary embodiment. Further, one integral coolant passage may be provided for each of battery stacks. The one integral coolant passage passes through a restraint member on one side, an end plate on the other side, and a restraint member on the other side, in this order, in such a manner that the one integral coolant passage surrounds three sides of each of the battery stacks. One end of the one integral coolant passage may communicate with the coolant supplying passage. The other end of the one integral coolant passage may communicate with the coolant discharging passage. In this way, ends on both sides in the X direction, and lateral portions on both sides in the Y direction, of the battery stacks may be cooled. Alternatively, battery stacks may be cooled from both sides in the X direction and both sides in the Y direction.

In the above description, the cross-sectional areas of coolant passages extending in the X direction, becomes larger, as coolant passages go away from the coolant circulator in the Y direction. However, cross-sectional areas of all coolant passages may be equal.

In the above description, two battery packs, or first battery pack 20 and second battery pack 40, are integrated to form integrated battery pack 1. However, only first battery pack 20 may be independently used. Alternatively, a product may be formed by covering only first battery pack 20 with a case that has a size that corresponds to a size of first battery pack 20. In this way, a battery pack may include only a plurality of battery stacks stacked in the Y direction. Alternatively, an integrated battery pack may include at least three battery packs that are integrated and each include only a plurality of battery stacks stacked in the Y direction.

Figure 5:
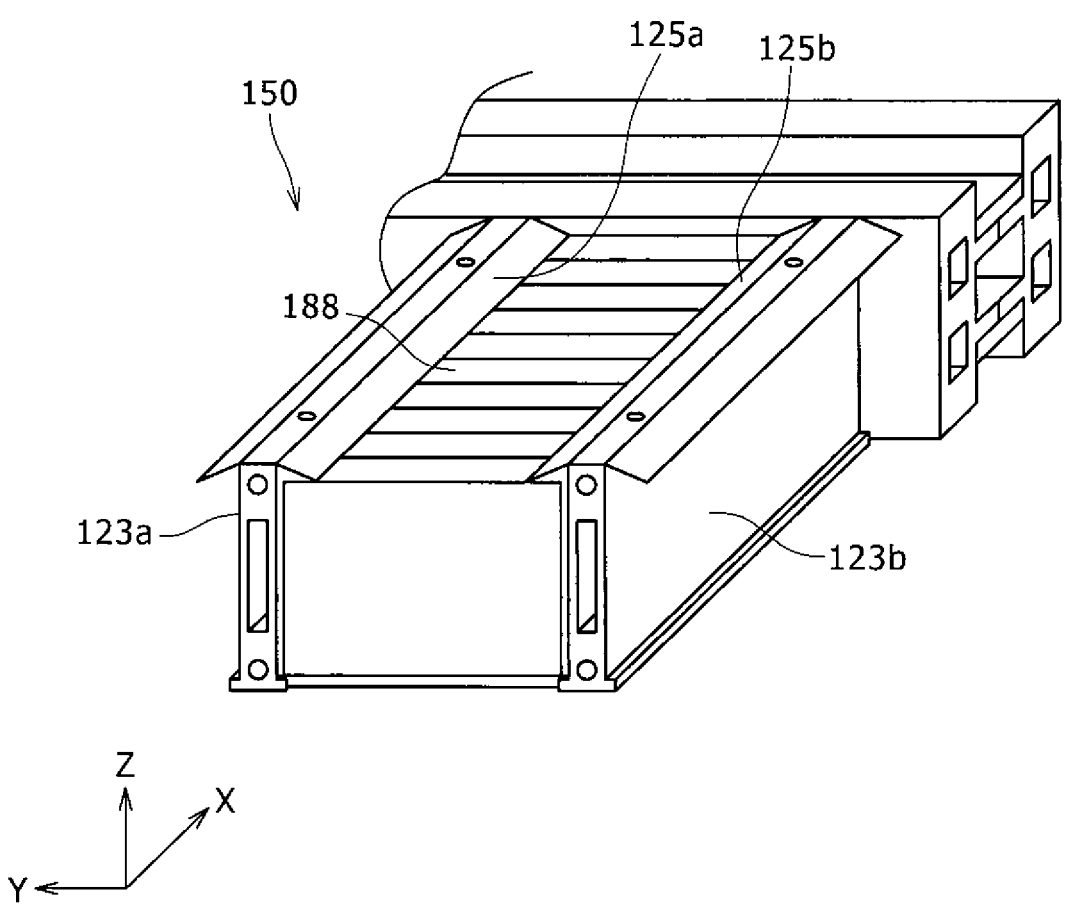
FIG. 5 is a perspective view of part of a battery module according to a modified example.
Figure 5:
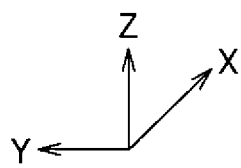

Further, as illustrated in FIG. 5, that is, a perspective view of part of battery module 150 according to a modified example, restraint member 123a on one side and restraint member 123b on the other side may include respective Z-direction movement regulators 125a, 125b that each have a shape like a long sheet. Z-direction movement regulators 125a, 125b overlap ends, in a longitudinal direction, of rectangular batteries 188 when Z-direction movement regulators 125a, 125b are seen in the Z direction. Consequently, rectangular batteries 188 surely do not disengage from battery module 150 in the Z direction.

Figure 6:
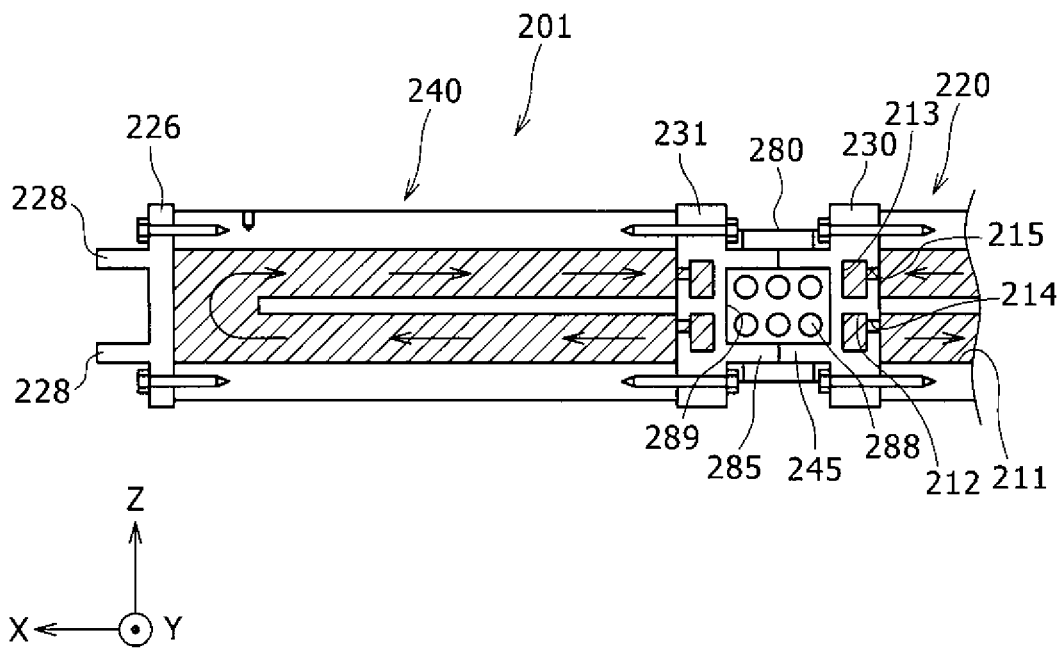
FIG. 6 is a cross-sectional view of part of an integrated battery pack according to a further modified example.

As illustrated in FIG. 6, or a cross-sectional view of part of integrated battery pack 201 according to a further modified example, end plate 226 on the other side disposed on an external side, in the X direction, of integrated battery pack 201 may include at least one rib 228 that projects externally in the X direction. Consequently, rigidity of integrated battery pack 201 may be increased. As illustrated in FIG. 6, also in integrated battery pack 201 according to the modified example, a pair of projections 245 of end plate 230 on one side of first battery pack 220 are made into contact with a pair of projections 285 of end plate 231 on one side of second battery pack 240. Four projections 245, 245, 285, 285 and both side surfaces extending substantially parallel to a YZ plane, define chamber 289 that has a rectangular XZ cross-section. Integrated battery pack 201 includes high-voltage cables 288 used to supply electric power to external equipment. High-voltage cables 288 are housed in chamber 289.

In the further modified example illustrated in FIG. 6, two external restraint members and all shared restraint members of first battery pack 220 contain respective U-shaped coolant passages 211, having a same shape and a same size. End plate 230 on one side contains: coolant-supplying-passage main body 212 that extends in the Y direction; and coolant-discharging-passage main body 213 that is disposed apart from coolant-supplying-passage main body 212 in the Z direction and extends in the Y direction.

End plate 230 on one side also contains coolant supplying hole 214. Coolant supplying hole 214 connects coolant-supplying-passage main body 212 with one end of U-shaped coolant passage 211. End plate 230 on one side also contains coolant discharging hole 215. Coolant discharging hole 215 connects coolant-discharging-passage main body 213 with the other end of U-shaped coolant passage 211.

Coolant-supplying-passage main body 212 and coolant supplying hole 214 constitute a coolant supplying passage. Coolant-discharging-passage main body 213 and coolant discharging hole 215 constitute a coolant discharging passage. Coolant supplying hole 214 and coolant discharging hole 215 that each communicate with same coolant passage 211 have a same area of a passage through which coolant flows. The area of the passage through which coolant flows is a YZ cross-section.

Further, integrated battery pack 201 includes a plurality of coolant supplying holes 214 and a plurality of coolant discharging holes 215. The areas of passages through which coolant flows of coolant supplying holes 214 and coolant discharging holes 215, gradually become larger, as coolant supplying holes 214 and coolant discharging holes 215 go away from a coolant circulator in the Y direction. The areas of passages through which coolant flows are YZ cross-sections. Consequently, flow rates of coolant that passes through coolant passage 211 are same or nearly equal, irrespective of distances from the coolant circulator.

Coolant supplying holes 214 and coolant discharging holes 215 have respective areas of passages through which coolant flows. The respective areas of passages through which coolant flows determine different flow rates of coolant. Consequently, shared restraint members 23 have a same structure. In addition to shared restraint members 23, restraint member 23a on one side and restraint member 23b on the other side have a same structure.

Coolant supplying holes 214 and coolant discharging holes 215 have the respective areas of passages through which coolant flows. Sizes of holes that form coolant supplying holes 214 and sizes of holes that form coolant discharging holes 215 determine the respective areas of passages through which coolant flows. Therefore, such areas of passages are easily determined differently. Second battery pack 240 has a structure of coolant passages that is similar to the structure of the coolant passages of first battery pack 220. The structure of coolant passages of second battery pack 240 will not be described.

Figure 7:
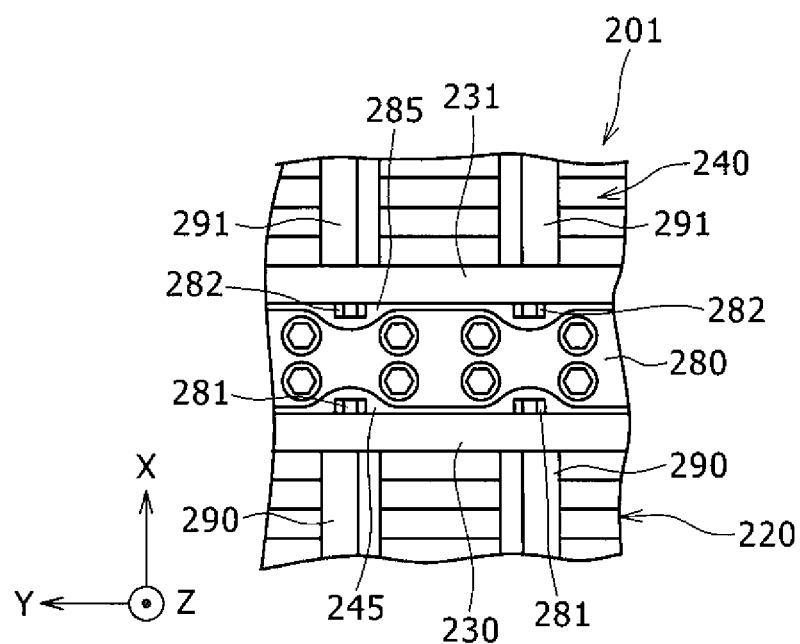
FIG. 7 is a plan view of part of the integrated battery pack illustrated in FIG. 6.

As illustrated in FIG. 7, that is, a plan view of part of integrated battery pack 201 illustrated in FIG. 6, plate 280 that extends in the Y direction may be used to join projection 245 of end plate 230 on one side of first battery pack 220 to projection 285 of end plate 231 on one side of second battery pack 240. As illustrated in FIG. 7, plate 280 may have a narrow width at positions, in the Y direction, where there are bolts 281, 282 that fix end plate 230 on one side and end plate 231 on one side to restraint members 290, 291. The narrow width is narrower than a width of other positions of plate 280. Alternatively, plate 280 may not overlap bolts 281, 282 when plate 280 is seen from above in the Z direction. The configuration is preferable since after restraint members 290, 291 are fixed to end plate 230 on one side and end plate 231 on one side with bolts 281, 282, two projections 245 and 285 are fixed to each other with plate 280, and thus integrated battery pack 201 is easily made.

The invention claimed is:

1. An integrated battery pack comprising:
a first battery pack; and
a second battery pack, each battery pack of the first and second battery packs including:
a plurality of battery stacks that are arranged in a plurality of rows, and each include a plurality of rectangular batteries that each have a substantially rectangular-parallelepiped shape, and are stacked in a row in a thickness direction,
a shared restraint member that is between a first battery stack and a second battery stack of the plurality of battery stacks, the first battery stack and the second battery stack are adjacent to each other in a perpendicular direction that is perpendicular to a stacking direction, the shared restraint member restraining: a side surface on a side of the second battery stack, in the first battery stack; and a side surface on a side of the first battery stack, in the second battery stack, the shared restraint member including a shared coolant passage through which coolant flows, the coolant cooling both the first battery stack and the second battery stack simultaneously,
external restraint members that restrain external sides in the perpendicular direction of the battery stacks, the external sides being located at both ends in the perpendicular direction in the plurality of battery stacks, the external restraint members each including an external coolant passage through which coolant flows,
a first end plate on one side in the stacking direction that is integral and restrains the one side in the stacking direction of the plurality of battery stacks, and
a second end plate on another side in the stacking direction that is integral and restrains the another side in the stacking direction of the plurality of battery stacks, wherein
only the first end plate includes a coolant passage on end side through which coolant passes, and the coolant passage on the end side communicates with the shared coolant passage and the external coolant passage of each of the external restraint members,
each of the first end plate and the second end plate extends beyond the external restraint members in the perpendicular direction, and
the first end plate of the first battery pack is in contact with the first end plate of the second battery pack.

2. The battery pack according to claim 1, wherein the coolant passage on end side includes
a coolant supplying passage that includes a coolant supplying opening at an end surface on one side in the perpendicular direction in the first end plate, and extends from the coolant supplying opening to another side in the perpendicular direction, and
a coolant discharging passage that includes a coolant discharging opening at the end surface on the one side in the perpendicular direction in the first end plate, extends from the coolant discharging opening to the another side in the perpendicular direction, and is apart from the coolant supplying passage,
the shared coolant passage and the external coolant passage each have a U-shape which has an end on one side and an end on another side, and
the end on the one side of each of the shared coolant passage and the external coolant passage communicates with the coolant supplying passage, and the end on the another side of each of the shared coolant passage and the external coolant passage communicates with the coolant discharging passage.

3. The battery pack according to claim 2, wherein cross-sectional areas of the shared coolant passage and the external coolant passages of the external restraint members become larger as a separation of the shared coolant passage and the external coolant passages increases from one side of the perpendicular direction along the perpendicular direction.

4. The battery pack according to claim 1, wherein cross-sectional areas of the shared coolant passage and the external coolant passages of the external restraint members, becomes larger as a separation of the shared coolant passage and the external coolant passages increases from one side of the perpendicular direction along the perpendicular direction.

* * * * *